Oct. 1, 1935.  M. WILDERMAN  2,016,163
FILTER
Filed May 2, 1933  4 Sheets-Sheet 1
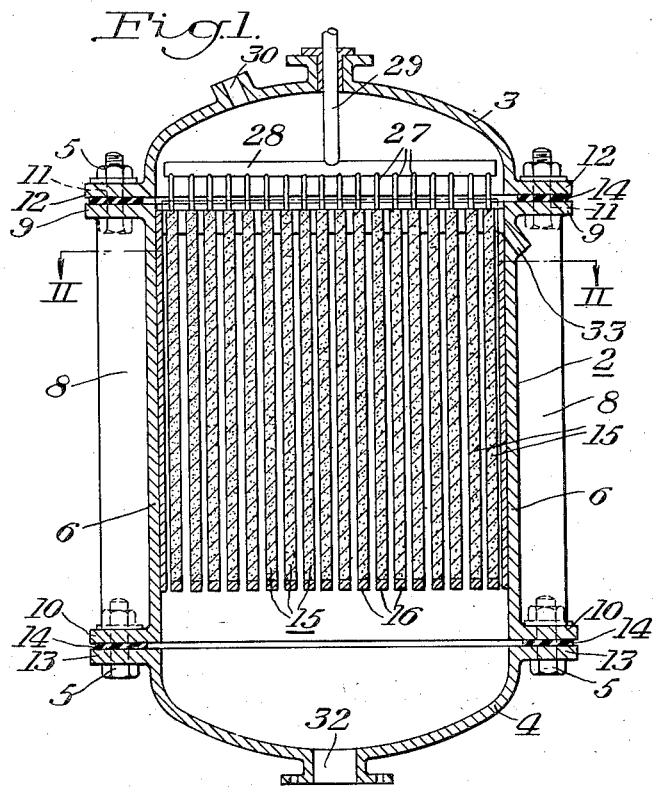

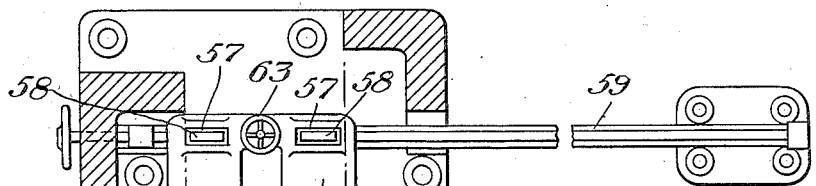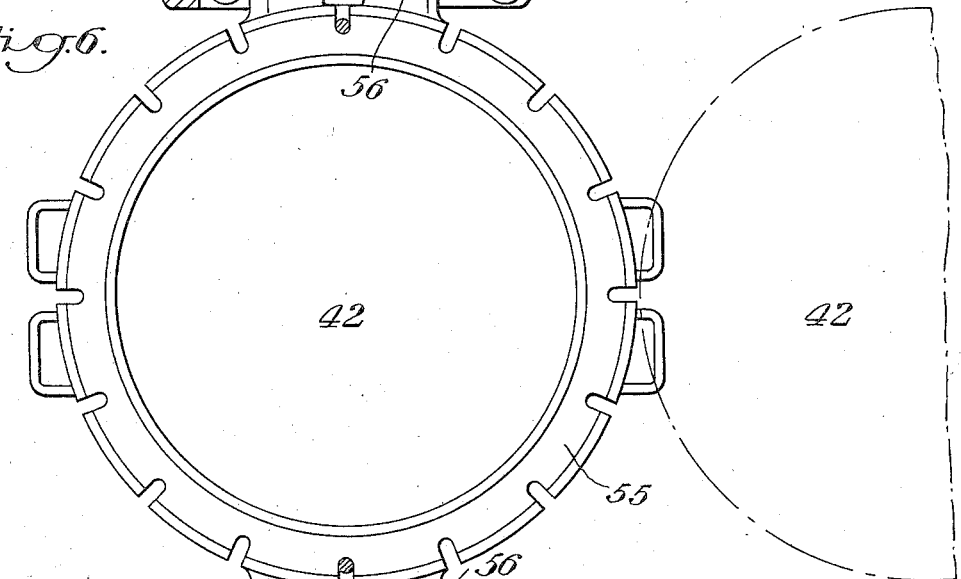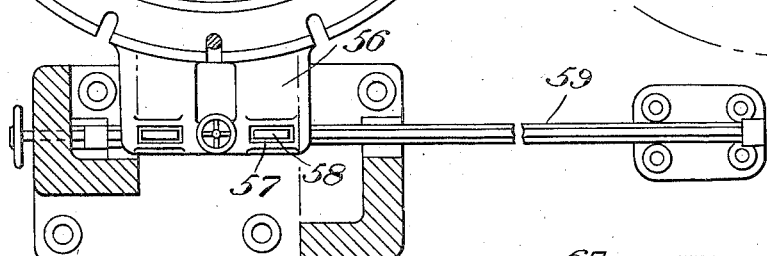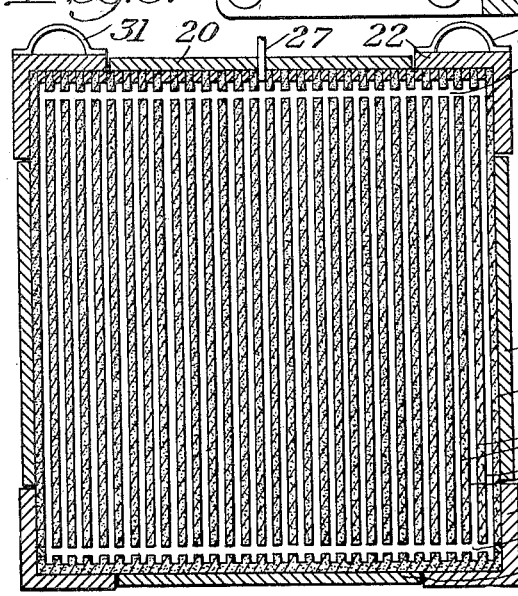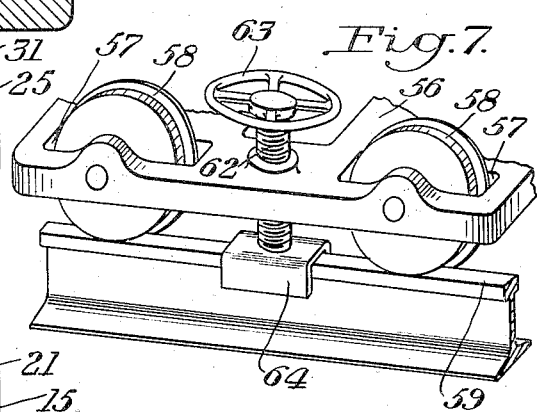

Oct. 1, 1935.    M. WILDERMAN    2,016,163

FILTER

Filed May 2, 1933    4 Sheets-Sheet 3

INVENTOR

Meyer Wilderman
by Byrnes, Stebbins, Parmelee & Blenko
His Attys.

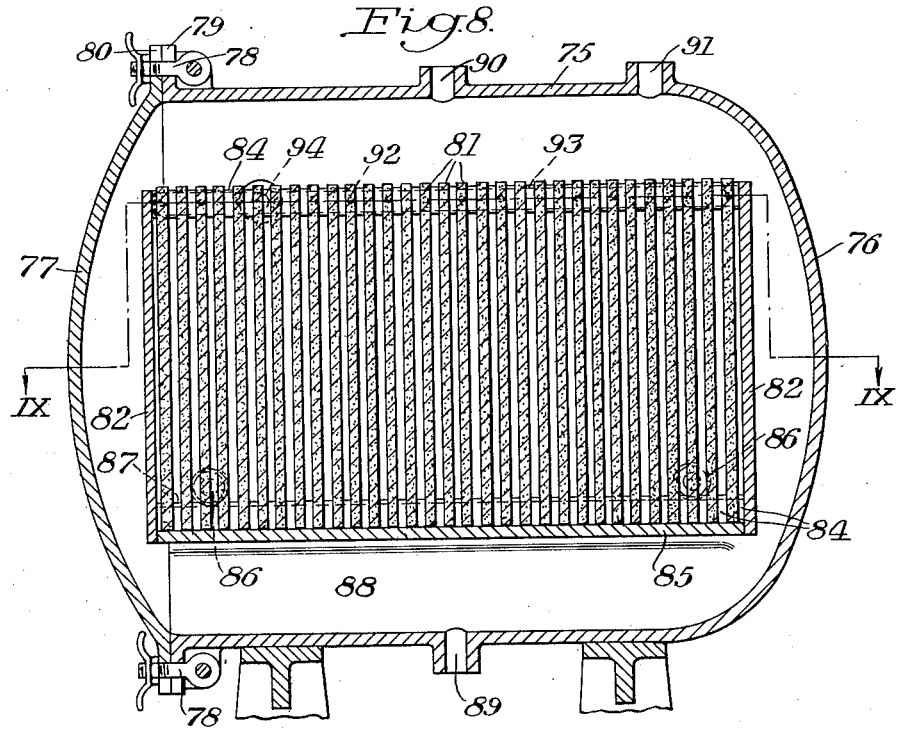
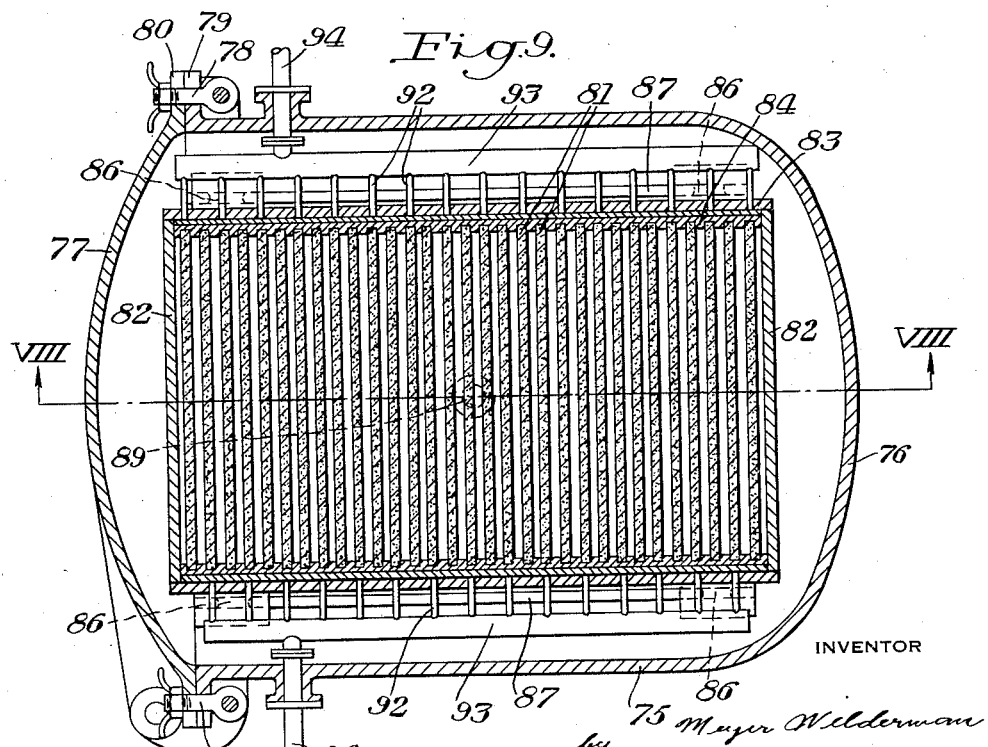

Patented Oct. 1, 1935

2,016,163

UNITED STATES PATENT OFFICE 2,016,163

FILTER

Meyer Wilderman, Monte Carlo, Monaco, assignor to The American Wilderman Porous Ebonite Company, Philadelphia, Pa., a corporation of Pennsylvania Application May 2, 1933, Serial No. 668,955
In Great Britain June 30, 1932

7 Claims. (Cl. 210—182)

This invention relates to filters which may be of the filter press type or vacuum filter type. It provides a large filtering capacity for a given space and is so constructed that the cakes formed between the filter plates can be removed simultaneously by air pressure or circulation of liquid without the necessity of taking the filter apart and removing the cakes individually. The filter is adapted for filtering solutions containing very fine suspensions, for which at the present time a Seitz or similar filter is ordinarily used. A Seitz filter contains metal gauze sheets attached to and supported by a grid. In using such a filter, a filtering medium such as asbestos flakes is mixed with a portion of the solution to be filtered and this portion is introduced into the filter, thereby depositing the asbestos flakes on the gauze sheets, so that the asbestos forms a filtering medium for the rest of the solution to be filtered. The type of filter just described is unsatisfactory in that the backwashing sometimes forms holes in the asbestos sheet and allows the washing solution to pass therethrough without washing the remainder of the cake. The amount of asbestos or other filtering material necessary to use is relatively large, which makes the operation costly. It is not adapted for filtering solutions of acids or certain other chemicals which would attack the gauze sheets.

These disadvantages are overcome according to the present invention, in which the filter plates preferably are formed of porous ebonite. The filter plates may be made in accordance with my Patent No. 1,651,567, granted December 6, 1927.

In the accompanying drawings, which illustrate several embodiments of my invention, Figure 1 is a vertical section taken on the line I—I of Figure 2;

Figure 2 is a horizontal section taken on the line II—II of Figure 1;

Figure 3 is a vertical section through a single filter plate as it would appear if taken on the line III—III of Figure 2;

Figure 6 is a top plan view of the apparatus shown in Figure 4 illustrating the manner in which the bottom of the filter may be brought into and out of position;

Figure 7 is a detail perspective view of the means for raising and lowering the removable bottom of the filter shown in Figure 4;

Figure 8 is a vertical section through another type of filter in which the filter plates may be removed bodily from the casing, the view being taken on the line VIII—VIII of Figure 9;

Figure 9 is a horizontal section taken on the line IX—IX of Figure 8; and

Figure 10 is a broken side elevation of one of the filter plates.

Figure 4:
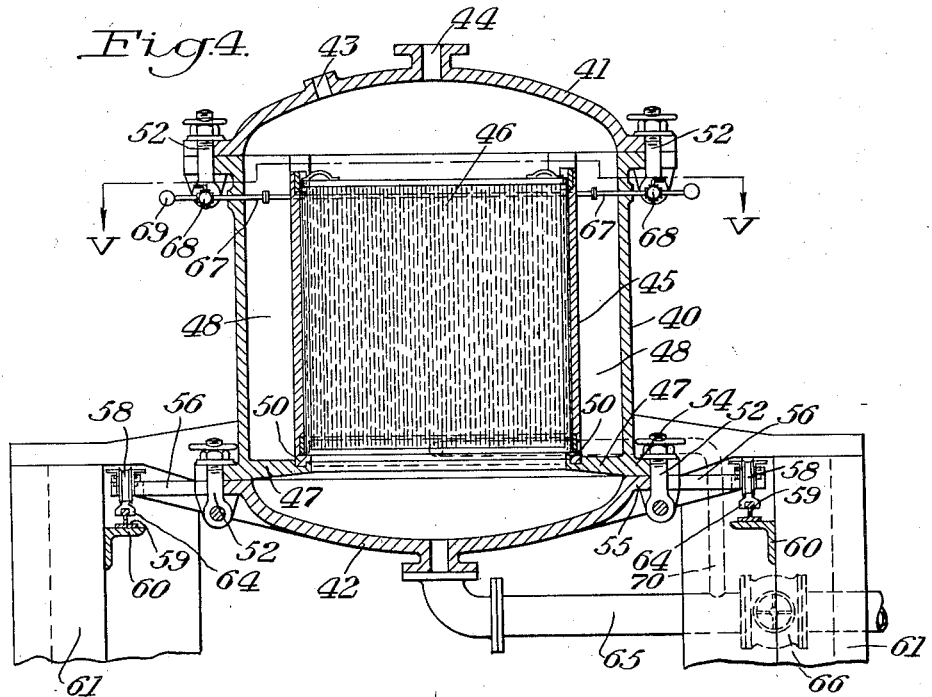
Figure 4 is a vertical section of a modified type of filter.

Referring more particularly to Figures 1, 2 and 3, the filter comprises a body portion 2 having a removable top 3 and a removable bottom 4 secured to the body by bolts 5. The body 2 is formed of side plates 6 and end plates 7 provided with strengthening ribs 8. It also has a top flange 9 and a bottom flange 10 provided with openings 11, which flanges are connected respectively by the bolts 5 to a flange 12 formed on the top 3 and a flange 13 formed on the bottom 4. Packing 14 is inserted between the flanges in order to make the filter liquid-tight.

A plurality of filter plates indicated generally by the reference numeral 15 is arranged in spaced relation inside of the casing. The filter plates are supported by horizontal bars 16 which extend between the end plates 7 adjacent the bottom thereof and secured thereto. The plates are maintained in spaced relation with each other so as to provide spaces for the solution to be filtered, by grooved bars 17 secured to the end plates 7, the vertical edges of the filter plates fitting into grooves 18 formed in the bars 17.

The construction of each of the filter plates 15 is shown in Figure 3. It comprises top and bottom bars 20, side bars 21 and angle shaped corner bars 22, all of the bars preferably being made of metal covered with ebonite. Inside of the frame formed by the bars 20, 21 and 22 is a filtering body 23 preferably formed of porous ebonite. The filtering body 23 is provided with spaced vertical channels 24 which are connected at the top and bottom by horizontal channels 25 and 26. Communicating with the upper horizontal channel 25 is a pipe 27. The pipes 27 of each individual filter plate 15 are connected to a header 28, as shown in Figure 1, and connected to the header is a pipe 29 which extends out through the top 3 of the filter. The top 3 is provided with an opening 30, through which air or water may be supplied for removing the filter cake after the filtering operation has been completed. The filter plate is provided with handles 31.

In the operation of this filter, the solution to be filtered and containing solids in suspension is introduced into the filter through an opening 32 formed in the bottom 4. The air opening 30 in the top of the filter is plugged at this time so as to form a liquid-tight chamber. The solution to be filtered flows upwardly between the filter plates 15, the solids depositing on the outside of the plates and the filtrate passing through the filter plates into the internal channels 24, 25 and 26. The filtrate flows through the pipes 27, header 28 and pipe 29 which extends outside of the filter apparatus. In this operation, the solution to be filtered occupies the whole interior of the casing above, below and between the filter plates, thus exerting an equal pressure on all sides of the plates. The operation can be carried on under pressure or partial vacuum, the pipe 29 in the latter case being connected to a source of vacuum.

After the filtering operation has stopped and it is desired to remove the cakes which have formed in the spaces between the filter plates, the solution is removed through openings 32 and 33 located, respectively, in the bottom and side of the apparatus. The bolts 5 are then removed and the bottom 4 moved out of position. Air is then introduced through opening 30, and if desired, through pipe 29. The air introduced through pipe 29 flows into the channels formed in the filter plates, thereby pressing the cake away from the plates and aiding the air introduced through opening 30 in removing the cakes from the spaces between filter plates. The filter plates are preferably made slightly thicker at the top than at the bottom so as to aid in the easy removal of the cakes. This construction of the filter plate is shown in Figure 10. When the filter plates are arranged within the casing they provide free spaces for the solution to be filtered, which spaces are wider at the bottom than at the top so as to make it easy to remove the cakes formed between the filter plates. If desired, air may be introduced into the casing after the solution has been removed therefrom, the air acting to force the liquid contained in the cakes into the channels formed in the filter plates, thereby drying the cakes. The bottom 4 is then removed and air admitted through the pipe 29 so as to loosen the deposit from the filter plates and cause it to drop through the open bottom of the casing.

After the cakes have been removed, the bottom 4 is again secured to the body portion 2 of the filter and water is introduced into pipe 29 and caused to flow through the internal channels in the filter plates and then into the spaces between the filter plates so as to clean the plates preparatory to a new filtering operation.

Referring to the embodiment shown in Figures 4 through 7, the filter comprises a cylindrical body portion 40 having a removable top 41 and a removable bottom 42. The top is provided with openings 43 and 44, through which air or liquid may be admitted for washing purposes. Inside of the cylindrical outer casing 40 is an inner casing formed of vertical plates 45 providing a square chamber in which are located filter plates 46. The cylindrical outer casing 40 is formed with four inturned flanges 47 which support the plates 45 forming the filter chamber. This construction provides four chambers 48, each chamber being formed by a segment of the cylindrical casing 40, one of the plates 45, and one of the flanges 47. The flanges 47 are cut away at the corners of the filter chamber formed by the plates 45, thereby providing openings 49 which place the chambers 48 in communication with each other. The filter plates 46 are supported by flanges 50 formed on the bottoms of two of the plates 45, and are maintained in spaced relation by means of grooved bars 51 also secured to two of the plates 45. The bottom 42 of the filter is secured to the cylindrical body portion 40 by swinging bolts 52 which fit into grooves 53 formed in the flanges 54 and 55 of the body portion 40 and bottom 42.

The bottom 42 may be dropped away from the body portion 40 and moved on rails into another position. In order to accomplish this, two extensions 56 are formed on the flange 55 at diametrically opposite points, as shown in Figure 6. Each of these extensions is provided with openings 57, in each of which is mounted a wheel 58 which runs on a rail 59. These rails are supported by brackets 60 which, in turn, are secured to main supports 61, as shown in Figure 4. A lifting jack as indicated in Figure 7, is arranged on opposite sides of the bottom 42 for raising and lowering it so that it may be connected and disconnected from the body portion 40 of the filter. The jack comprises a screw 62 operated by a wheel 63 and carrying at its lower end a shoe 64 which fits over the rail 59. When it is desired to remove the bottom 42, the swinging bolts 52 are loosened and the screw 62 is turned so as to cause the wheels 58 to rest on the rails 59. The bottom 42 may then be moved by hand from the full line to the chain line position shown in Figure 6. After the cakes have been removed from between the filter plates, as hereinafter described, the bottom 42 is returned to position under the body portion 40. The screw 62 is then operated to raise the bottom into the position shown in Figure 4 and the bolts 52 are tightened.

Figure 5:
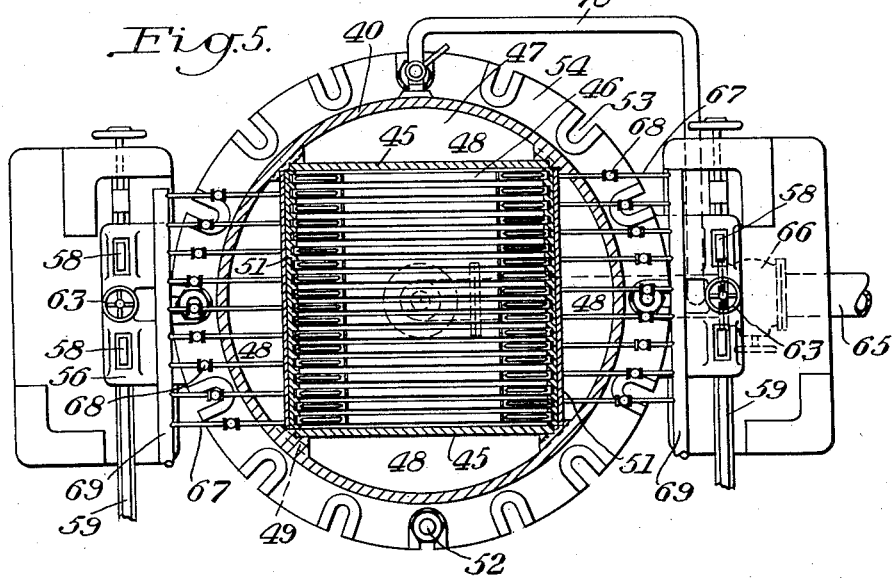
Figure 5 is a horizontal section taken on the line V—V of Figure 4.

The solution to be filtered is introduced through a pipe 65 controlled by a valve 66. It passes between the filter plates, the solids depositing on the outside of the plates and the liquid flowing through into the internal channels formed in the filter plates. The filtrate is led from the channels by pipes 67 controlled by valves 68, the pipes being connected to a header 69. The pipes 67 extend through plates 45 and communicate with the internal passages in the filter plates on the side of the filter plate adjacent the top. As shown in Figure 5, there are two series of pipes 67 and two headers 69, one series being located on each side of the filter the pipes of each series communicating with alternate filter plates.

After the filtering operation has stopped, the liquid is discharged through pipes 65 and 70 and the bottom 42 is detached from the body portion 40 and removed as previously described by operating the screw 62. The cakes formed between the filter plates are then removed by introducing air through the openings 43 and 44 and header 69, the filter plates are washed, and the bottom is again returned to the position shown in Figure 4.

In the embodiment shown in Figures 8 and 9, the filter comprises a cylindrical casing 75 closed at one end 76 and provided with a removable cover 77 at the other end. The cover is secured in position by swinging bolts 78 which fit into recesses formed in the flanges 79 and 80, respectively, of the casing and cover. Filter plates 81, provided with internal channels as previously described, are carried by a frame composed of end plates 82 and side plates 83. The filter plates are maintained in spaced relation by grooved bars 84 secured to the side plates along the top and bottom edges thereof and are supported by inturned flanges 85 formed at the lower edges of the side plates 83. The framework which supports the filter plates is, in turn, supported by rollers 86 which run on rails 87 mounted on a support 88. The casing 75 is provided with an opening 89, through which the solution to be filtered is introduced and with openings 90 and 91 for air or water used in washing the cake or removing it from between the filter plates. Pipes 92 communicate with the internal passages in the filter plates, the pipes being connected to a header 93 which communicates with a discharge pipe 94 for the filtrate. There are two series of pipes 92, 93 and 94, one on each side of the filter plates, the pipes 92 of each series communicating with the internal passages in alternate filter plates.

In the operation of this modification, the solution to be filtered containing solids in suspension is introduced through the opening 89, the openings 90 and 91 being plugged at this time. The solution flows between the filter plates, the solids collecting on the outer surfaces of the plates and the filtrate flowing into the internal passages in a manner similar to that described in connection with the other embodiments. The filtrate is delivered from the plates by means of the pipe 92, header 93 and pipe 94. When it is desired to remove the cakes formed between the filter plates, the solution is first removed through opening 89 and air is introduced through either or both of the openings 90 and 91 and the pipe 94.

If desired, the frame with the filter plates supported thereon is moved outside of the casing 75 after removing the cover 77, and the removal of the cakes is performed outside of the casing, after which the frame and plates may be again moved back within the casing. The cover is then closed and the filter plates are washed by introducing water through the pipes 94, after which the apparatus is again ready for performing another filtering operation.

The shape of the filter plates may be varied to suit conditions irrespective of the particular type of filter which is employed. In cases where the solution to be filtered will attack metal, the metal surfaces should be lined with rubber or other suitable material which resists the action of the solutions.

I have illustrated and described several embodiments of my invention. It is to be understood, however, that the invention may be otherwise embodied within the scope of the following claims.

I claim:

1. A filter comprising a casing having a top and a bottom which may be removed separately from the casing, a plurality of spaced porous filter plates in the casing providing spaces which are open at the top and bottom between the plates, each of said filter plates consisting of a single unit provided with internal channels, means for forcing a fluid under pressure through said channels into the spaces between the filter plates to loosen deposits on the filter plates, and means operable simultaneously with said last mentioned means for creating a higher pressure in the space above said filter plates than in the space below them in order to remove the deposits formed between the filter plates.

2. A filter comprising a casing having a top and a bottom which may be removed separately from the casing, a plurality of closely spaced porous filter plates in the casing providing spaces which are open at the top and bottom between the plates, each of said filter plates consisting of a single unit provided with internal channels, said filter plates being so closely spaced that after the filtering operation has been completed they together with the deposits formed thereon seal the spaces above and below said filter plates from each other, means for forcing a fluid under pressure through said channels into the spaces between the filter plates to loosen deposits on the filter plates, and means operable simultaneously with said last mentioned means for admitting fluid under superatmospheric pressure to the space above said filter plates in order to remove the deposits formed between them.

3. A filter comprising a casing having a top and a bottom which may be removed separately from the casing, a plurality of spaced porous filter plates in the casing providing spaces which are open at the top and bottom between the plates, each of said filter plates consisting of a single unit provided with vertical internal channels communicating adjacent their tops and bottoms with horizontal internal channels and having an outlet for the filtrate, means for forcing a fluid under pressure through said channels into the spaces between the filter plates to loosen deposits on the filter plates, and means operable simultaneously with said last mentioned means for creating a higher pressure in the space above said filter plates than in the space below them in order to remove the deposits formed between the filter plates.

4. A filter comprising a casing having a top and a bottom which may be removed separately from the casing, a plurality of spaced porous ebonite filter plates in the casing providing spaces which are open at the top and bottom between the plates, each of said filter plates consisting of a single unit provided with internal channels, means for forcing a fluid under pressure through said channels into the spaces between the filter plates to loosen deposits on the filter plates, and means operable simultaneously with said last mentioned means for creating a higher pressure in the space above said filter plates than in the space below them in order to remove the deposits formed between the filter plates.

5. In a filtering operation, the method of removing deposits from the spaces between filter plates provided with internal channels, which comprises forcing a fluid under pressure through the channels into the spaces between the filter plates to loosen the deposits, and simultaneously creating a higher pressure on the tops of the deposits than on the bottoms thereof to force them from said spaces.

6. In a filtering operation, the method of removing deposits from the spaces between filter plates provided with internal channels, which comprises forcing a fluid under superatmospheric pressure through the channels into the spaces between the filter plates to loosen the deposits, and simultaneously applying a fluid under superatmospheric pressure to the tops of the deposits while maintaining the bottoms of the deposits at a lower pressure than that applied to the tops to force the deposits from said spaces.

7. In a filtering operation, the method of removing deposits from the spaces between filter plates provided with internal channels, which comprises forcing a fluid under superatmospheric pressure through the channels into the spaces between the filter plates to loosen the deposits, and simultaneously applying a fluid under superatmospheric pressure to the tops of the deposits while maintaining the bottoms of the deposits at atmospheric pressure to force the deposits from said spaces.

MEYER WILDERMAN.